United States Patent
Makino et al.

(10) Patent No.: US 11,209,038 B2
(45) Date of Patent: Dec. 28, 2021

(54) BOLT

(71) Applicant: MEIDOH CO., LTD., Toyota (JP)

(72) Inventors: Koji Makino, Toyota (JP); Masataka Kondo, Toyota (JP); Katsuhide Takei, Toyota (JP); Akihiro Futamura, Toyota (JP); Shun Nishimura, Toyota (JP); Shungo Maki, Toyota (JP)

(73) Assignee: MEIDOH CO., LTD., Toyota (JP)

( * ) Notice: Subject to any disclaimer, the term of this patent is extended or adjusted under 35 U.S.C. 154(b) by 320 days.

(21) Appl. No.: 16/344,374

(22) PCT Filed: Oct. 25, 2017

(86) PCT No.: PCT/JP2017/038589
§ 371 (c)(1),
(2) Date: Apr. 24, 2019

(87) PCT Pub. No.: WO2018/088218
PCT Pub. Date: May 17, 2018

(65) Prior Publication Data
US 2019/0257346 A1    Aug. 22, 2019

(30) Foreign Application Priority Data

Nov. 11, 2016   (JP) .............................. JP2016-233469

(51) Int. Cl.
*F16B 33/02* (2006.01)
*F16B 35/00* (2006.01)

(52) U.S. Cl.
CPC .............. *F16B 33/02* (2013.01); *F16B 35/00* (2013.01)

(58) Field of Classification Search
CPC .... F16B 25/0084; F16B 25/103; F16B 33/02; F16B 35/00

(Continued)

(56) References Cited

U.S. PATENT DOCUMENTS 3,352,190 A * 11/1967 Carlson ................. F16B 35/047
411/403
5,788,441 A * 8/1998 Karabestos ............. F16B 33/02
411/366.3

(Continued)

FOREIGN PATENT DOCUMENTS

CN     101208526 A    6/2008
CN     102171464 A    8/2011
(Continued)

OTHER PUBLICATIONS

International Search Report dated Jan. 23, 2018 in PCT/JP2017/038589 filed on Oct. 25, 2017.

(Continued)

*Primary Examiner* — Roberta S Delisle
(74) *Attorney, Agent, or Firm* — Oblon, McClelland, Maier & Neustadt, L.L.P.

(57) ABSTRACT

A bolt which can prevent seizure is provided due to the bolt being installed obliquely. A guide portion is formed between a groove portion formed at a distal end portion of the threaded portion and a surface end position on a base end side of the tapered surface, a starting end portion of the guide portion being an intersection between the surface end position on the base end side of the tapered surface and a helix according to the groove portion, a terminal end portion of the guide portion overlaps with the distal end portion of the threaded portion, an angle in the direction around the axis of the bolt from the starting end portion to the terminal end portion is set in the range of 90° to 360°.

5 Claims, 6 Drawing Sheets

(58) Field of Classification Search
USPC .......... 411/386, 387.3, 387.4, 411, 424, 426
See application file for complete search history.

(56) References Cited

U.S. PATENT DOCUMENTS

| | | | | |
|---|---|---|---|---|
| 6,062,786 | A * | 5/2000 | Garver | ................... F16B 35/047 |
| | | | | 411/386 |
| 6,149,363 | A * | 11/2000 | March | ...................... B21H 3/06 |
| | | | | 411/366.1 |
| 6,685,411 | B2 * | 2/2004 | Kato | ....................... F16B 33/02 |
| | | | | 411/386 |
| 6,796,761 | B2 * | 9/2004 | Mizuno | ................. F16B 35/047 |
| | | | | 411/386 |
| 7,670,091 | B2 * | 3/2010 | Kato | .................... F16B 35/047 |
| | | | | 411/386 |
| 7,866,930 | B2 * | 1/2011 | Murase | ................. F16B 35/047 |
| | | | | 411/386 |
| 8,197,170 | B2 * | 6/2012 | Wagner | ................. F16B 35/047 |
| | | | | 411/386 |
| 8,632,288 | B2 * | 1/2014 | Konagaya | ............ F16B 35/047 |
| | | | | 411/386 |

| | | |
|---|---|---|
| 2009/0060676 A1 | 3/2009 | Murase et al. |
| 2011/0200410 A1 | 8/2011 | Konagaya et al. |
| 2014/0314519 A1 | 10/2014 | Konagaya et al. |

FOREIGN PATENT DOCUMENTS

| | | |
|---|---|---|
| CN | 104302932 A | 1/2015 |
| JP | 2001-82431 A | 3/2001 |
| JP | 2002-147425 A | 5/2002 |
| JP | 2004-116771 A | 4/2004 |
| JP | 2004-232682 A | 8/2004 |
| JP | 2005-42904 A | 2/2005 |
| JP | 2012-504731 A | 2/2012 |

OTHER PUBLICATIONS

Combined Chinese Office Action and Search Report dated Apr. 9, 2020 in corresponding Chinese Patent Application No. 201780066030.4 (with English Translation and English Translation of Category of Cited Documents), 14 pages.

* cited by examiner

BOLT

TECHNICAL FIELD

The present invention relates to a bolt used for fastening automobile parts and the like.

BACKGROUND ART

In the prior art, when a bolt is tightened against an internal thread such as a nut, seizure may occur due to the bolt being installed obliquely. In order to solve this problem, a bolt as disclosed in Patent Literature 1 has been proposed.

In the bolt of Patent Literature 1, a guide boss portion is formed so as to protrude from a distal end of a shank provided with a thread. When the bolt tilts at the time of tightening, since the tilt is corrected by the guide boss portion, occurrence of seizure can be prevented.

However, in order to exert the function of the guide boss portion, the bolt of Patent Literature 1 requires the length of the guide boss portion, which is equal to or more than half the nominal diameter, in addition to a thread length necessary for tightening, so that the under-head length of the bolt has tended to increase. In view of weight saving and space constraints, this tendency is not preferable in many cases.

In order to solve the problem of the bolt of Patent Literature 1, a bolt as disclosed in Patent Literature 2 has been proposed. In the bolt of Patent Literature 2, a starting end portion of a complete thread of a threaded portion of a shank is provided in a cutout shape in which with a crest of a distal end ridge as the boundary, while the outside bends forward, the inside bends backward. In this bolt, since the starting end portion of the complete thread provided in the cutout shape catches an internal thread to correct the tilt, it is possible to prevent seizure without increasing the under-head length of the bolt.

CITATIONS LIST

Patent Literatures

Patent Literature 1: JP-A-2001-082431
Patent Literature 2: JP-A-2004-116771

SUMMARY OF INVENTION

Technical Problems

Although the bolt of Patent Literature 2 has a function of preventing seizure due to oblique installation, this function has not been sufficient. Particularly, if a material of an internal thread is soft, such as aluminum alloy, the internal thread is damaged by a threaded portion, so that seizure has somewhat occurred.

The present invention has been made to solve the above-described problems, and therefore, has an object to provide a bolt which can more effectively prevent seizure due to the bolt being installed obliquely without increasing the under-head length of the bolt.

Solutions To Problems

In order to solve the above problem, the invention of claim 1 is a bolt including a tapered surface, a guide portion, and a threaded portion in order from a distal end side, and is characterized in that the guide portion exists on the extension of a same helix as a groove of the threaded portion and is formed between a groove portion formed at a distal end portion of the threaded portion so that a depth in a radial direction of the groove portion is deeper than the groove and a surface end position on a base end side of the tapered surface, that the guide portion has a shape extending in a direction around an axis of the bolt from a starting end portion to a terminal end portion and expanding in an axial direction of the bolt in transition from the starting end portion to the terminal end portion, the starting end portion being an intersection between the surface end position on the base end side of the tapered surface and a helix according to the groove portion, that the guide portion and the threaded portion are continuously formed such that the distal end portion of the threaded portion overlaps with the terminal end portion of the guide portion, and that the guide portion is a part corresponding to a range from 90° to 360° as an angle in the direction around the axis of the bolt from the starting end portion.

The invention of claim 2 is an invention wherein a diameter of the guide portion is set to be smaller than a minor diameter of an internal thread corresponding to the bolt and larger than a diameter of the groove of the bolt in the invention according to claim 1.

The invention of claim 3 is an invention wherein a ridge has a complete height when the angle in the direction around the axis of the bolt is in the range of 30° to 180° in a starting end portion of the threaded portion in the invention according to claim 1 or 2.

The invention of claim 4 is an invention wherein a radial dimension of the bolt in the guide portion with reference to a bottom of the groove portion is 0.4 to 0.6 times the height of the ridge in the threaded portion with reference to a bottom of the groove of the bolt in the inventions according to any one of claims 1 to 3.

The invention of claim 5 is an invention wherein an angle with respect to an axis of the bolt is in the range of 15° to 45° and a diameter at a distal end of the bolt is 0.7 to 0.9 times a nominal diameter of the bolt, in the tapered surface in the inventions according to any one of claims 1 to 4.

Advantageous Effects of Invention

[Function]
According to the bolt of the present invention, the guide portion is provided between the tapered surface and the threaded portion. The guide portion has a shape expanding in the axial direction of the bolt in transition from the starting end portion to the terminal end portion, the angle in the direction around the axis of the bolt between the starting end portion and the terminal end portion is in the range of 90° to 360°, and the guide portion is continuously formed with the threaded portion so that the terminal end portion overlaps with the starting end portion of the threaded portion. Since the starting end portion of the guide portion formed in this manner is positionally deviated from the ridgeline of the ridge of the threaded portion toward the base end, when the bolt is installed so as to tilt largely with respect to the internal thread, the guide portion does not forcibly catch the internal thread. If the guide portion does not forcibly catch the internal thread, since the threaded portion does not mesh with the internal thread, the bolt tends to idle, and the incidence of seizure can be reduced. In the guide portion, since the angle in the direction around the axis of the bolt between the starting end portion and the terminal end portion is set in the range of 90° to 360°, it is possible to suppress that the under-head length of the bolt increases.

In the case where the diameter of the guide portion is set to be smaller than the minor diameter of the internal thread corresponding to the bolt and larger than the diameter of the groove of the bolt, when the bolt tilts largely obliquely with respect to the internal thread, the bolt can be caused to idle well.

In the starting end portion of the threaded portion, in the case where the ridge has a complete height when the angle in the direction around the axis of the bolt is in the range of 30° to 180°, the ridge has the complete height at an earlier stage than a general external thread, so that it can make it easier to correct deviation of the axis from the internal thread.

In the case where the radial dimension of the bolt in the guide portion with reference to the bottom of the groove portion is 0.4 to 0.6 times the height of the ridge in the threaded portion with reference to the bottom of the groove of the bolt, when the bolt tilts largely obliquely with respect to the internal thread, the bolt can be caused to idle well.

In the case where the angle with respect to the axis of the bolt is in the range of 15° to 45°, and the diameter at the distal end of the bolt is 0.7 to 0.9 times the nominal diameter of the bolt in the tapered surface, it is possible to prevent interference between a distal end portion of the bolt and an entrance of the internal thread corresponding to the bolt.

Effect

According to the present invention, the function of correcting the attitude of the bolt is provided without increasing the under-head length of the bolt, and meanwhile, when the tilt is large, idling is performed without forcibly trying to correct the attitude, so that seizure can be more effectively prevented under a wide range of circumstances.

DESCRIPTION OF EMBODIMENT

An embodiment of the present invention will be shown below.

Figure 1:
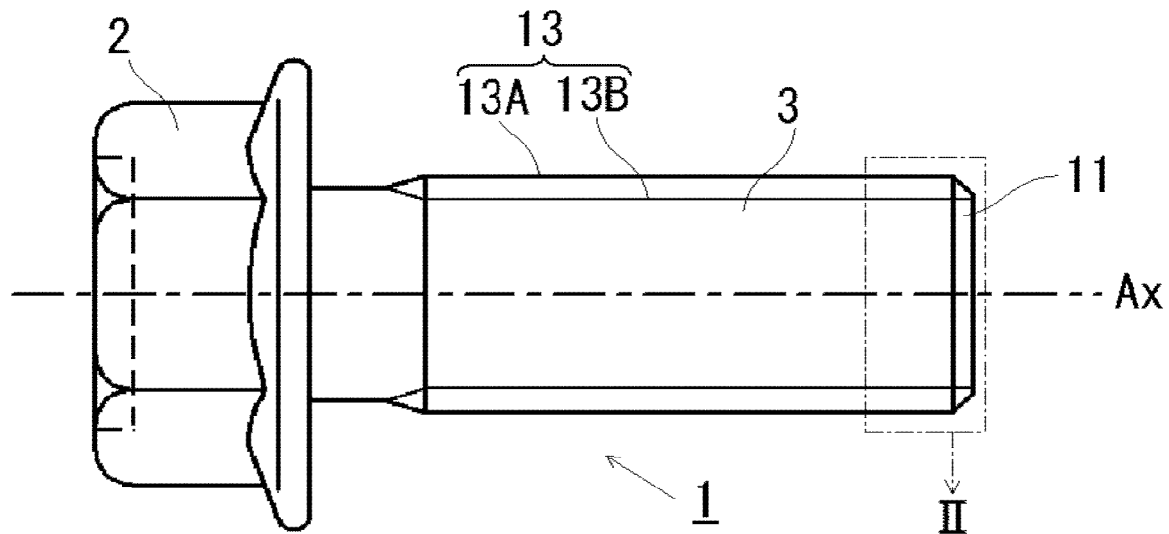
FIG. 1 is a schematic view of a bolt of the present embodiment.
Figure 2:
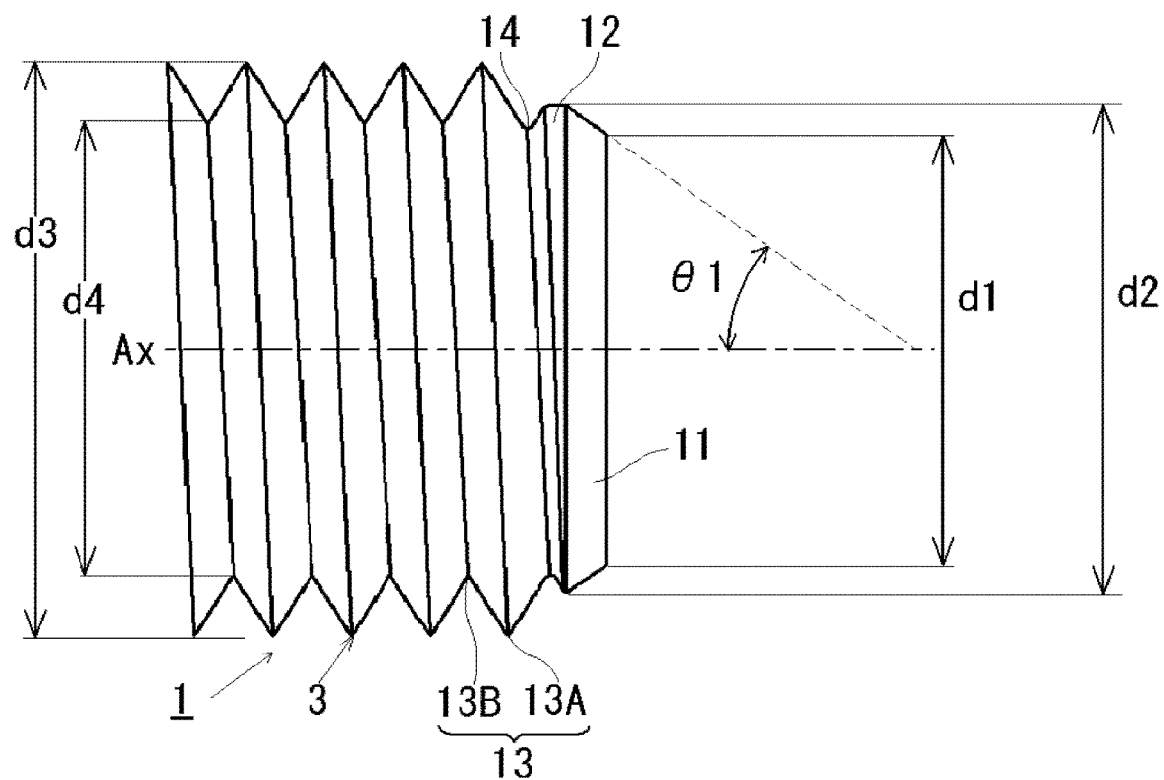
FIG. 2 is an enlarged view of a portion II in FIG. 1.

As shown in FIG. 1, a bolt 1 includes a head 2 and a shank 3 arranged on a same axis Ax. As shown in FIG. 2, the shank 3 is provided with a tapered surface 11, a guide portion 12, and a threaded portion 13 having a ridge 13A and a groove 13B in order from the distal end side.

Although the shape of the head 2 of the bolt 1 is not particularly limited and is a hexagonal prism shape in FIG. 1, the shape of the head 2 may be a cylindrical shape having a hexagon socket, a hemispherical shape, an inverted truncated cone shape, a ring shape, a butterfly shape, or the like. Alternatively, the head 2 may be omitted, and the bolt 1 may be a stud bolt.

The material of the bolt 1 is not particularly limited, and examples thereof include steel, stainless steel, alloy such as aluminum alloy and titanium alloy, synthetic resins, and the like, depending on the application.

In the following description, a base end side refers to the head 2 side of the bolt 1 in the direction of the axis Ax, and a distal end side refers to the shank 3 side of the bolt 1 in the direction of the axis Ax. In addition, a circumferential direction refers to a direction around the axis of the bolt 1, and a radial direction refers to a radial direction of the bolt 1.

As shown in FIG. 2, the tapered surface 11 is formed so as to have a smaller diameter toward the distal end side.

In the tapered surface 11, an angle $\theta 1$ with respect to the axis Ax is preferably set in the range of 15° to 45°. Further, in the tapered surface 11, a diameter d1 on the distal end side is preferably set to 0.7 to 0.9 times ($0.7d3 \leq d1 \leq 0.9d3$) the nominal diameter d3 of the bolt 1.

The angle $\theta 1$ is more preferably in the range of 20° to 45°, still more preferably in the range of 20° to 40°. The diameter d1 is more preferably 0.7 to 0.8 times, still more preferably 0.75 to 0.8 times the nominal diameter d3 of the bolt 1.

In the tapered surface 11, the angle $\theta 1$ and the diameter d1 are set as described above, whereby it is possible to prevent interference between a distal end portion of the bolt 1 and an entrance of the internal thread.

A groove portion 14 is provided at a distal end portion of the threaded portion 13. The groove portion 14 is formed so as to exist on the extension of a same helix as the groove 13B of the threaded portion 13. The groove portion 14 is formed so that the depth in the radial direction is slightly deeper than that of the groove 13B.

Figure 3:
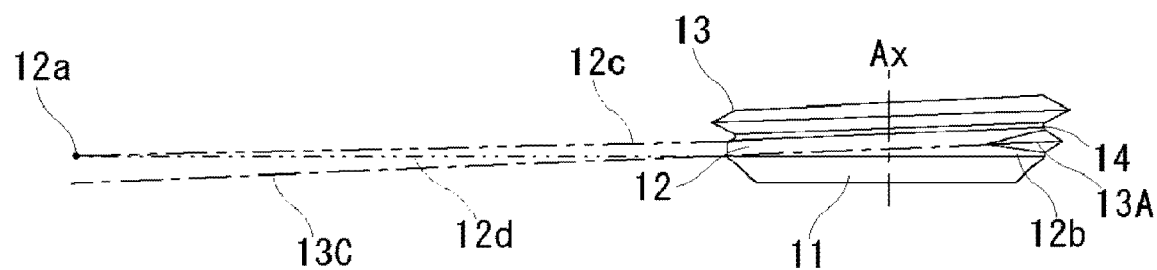
FIG. 3 is a view showing the vicinity of a rising edge of a threaded portion in the bolt of the present embodiment.

FIG. 3 is a view showing the guide portion 12 developed in a plane. A line 12c in FIG. 3 shows a helix according to the groove portion 14. A line 12d in FIG. 3 shows a surface end position on the base end side of the tapered surface 11.

The guide portion 12 is formed between the line 12d and the line 12c, that is, between the surface end position on the base end side of the tapered surface 11 and the groove portion 14.

Figure 4:
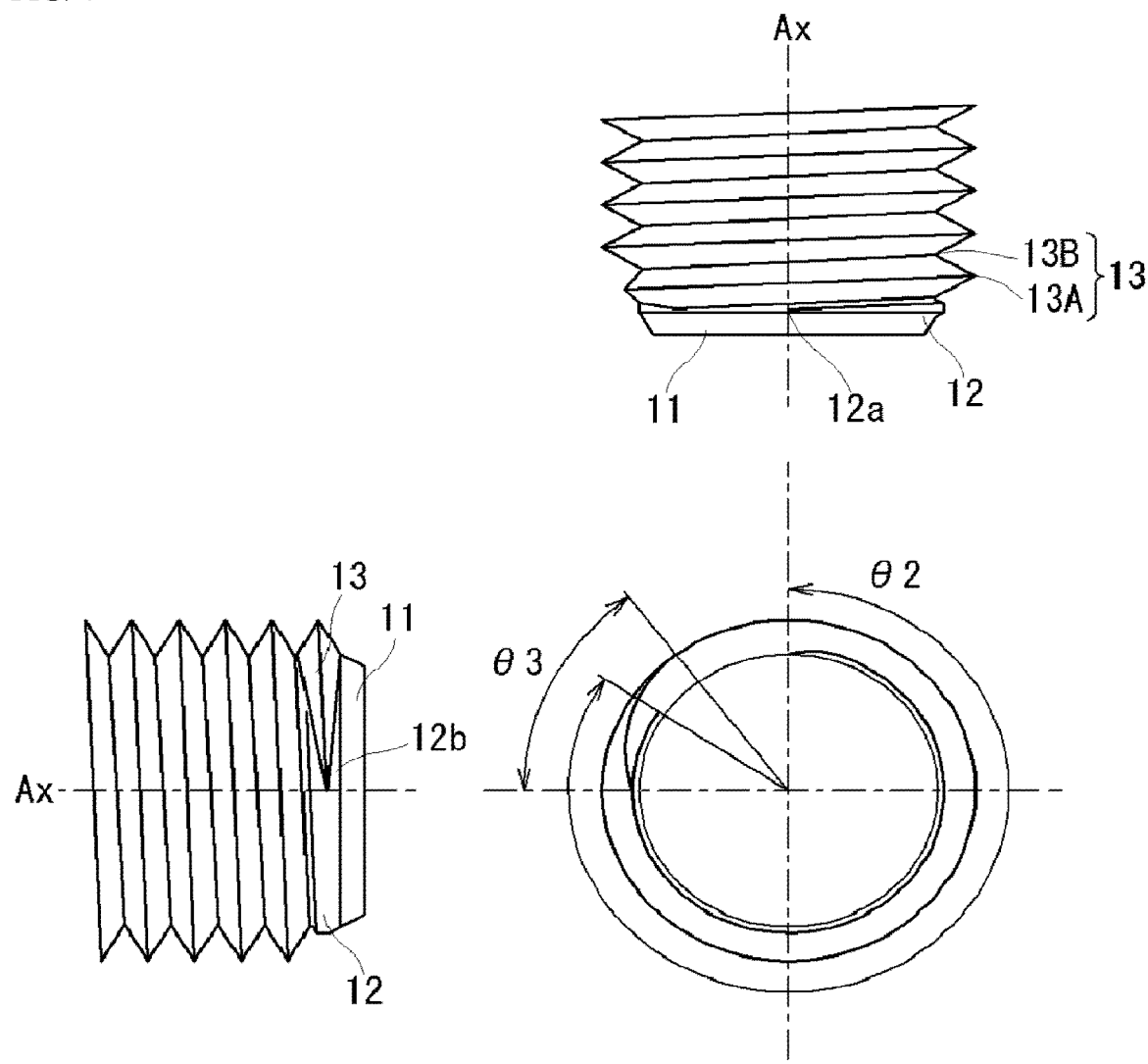
FIG. 4 is a view showing a positional relationship between a guide portion and the threaded portion in the bolt of the present embodiment.

As shown in FIG. 4, a starting end portion 12a of the guide portion 12 is provided on the surface end position (line 12d in FIG. 3) on the base end side of the tapered surface 11 and at an intersection between the line 12d and the helix (line 12c in FIG. 3) according to the groove portion 14. A terminal end portion 12b of the guide portion 12 is provided at a position extending clockwise from the starting end portion 12a in the circumferential direction.

A region where the guide portion 12 is formed is set at an angle θ2 in the circumferential direction between the starting end portion 12a and the terminal end portion 12b. The angle θ2 is necessarily in the range of 90° to 360° in view of the structure of the bolt 1.

The guide portion 12 is formed into a shape in which the guide portion 12 expands toward the base end side to become wider in transition from the starting end portion 12a to the terminal end portion 12b (see FIG. 3).

The height (dimension in the radial direction) of the guide portion 12 with reference to a bottom of the groove portion 14 is preferably 0.4 to 0.6 times the height of the ridge 13A with reference to a bottom of the groove 13B in the threaded portion 13. The height of the guide portion 12 is more preferably 0.4 to 0.55 times, still more preferably 0.45 to 0.55 times the height of the ridge 13A.

A diameter d2 of the guide portion 12 is preferably set to be slightly smaller than the minor diameter of the internal thread corresponding to the bolt 1 and slightly larger than a diameter d4 of the groove 13B.

Since the bolt 1 having the guide portion 12 set as described above can be prevented from entering an internal thread hole too much when inserted in a state tilting with respect to the axis of the internal thread, it is possible to reduce occurrence of biting due to pitch deviation between the bolt 1 and the internal thread.

The guide portion 12 is continuously formed with the threaded portion 13 so that the terminal end portion 12b overlaps with the starting end portion of the threaded portion 13.

At the terminal end portion 12b (the starting end portion of the threaded portion 13) of the guide portion 12, the height of the ridge 13A gradually increases in the circumferential direction from the starting end of the threaded portion 13, and the ridge 13A reaches the complete height (the same height as the other ridges 13A) at an angle θ3 (hereinafter referred to as "rising angle θ3") in the circumferential direction. The rising angle θ3 is preferably set to 30° to 180°. Further, the rising angle θ3 is more preferably set to 40° to 90°, still more preferably set to 50° to 70°.

The rising angle of a general external thread is set to 360° or more. That is, the threaded portion 13 is set so that the ridge 13A has the complete height at an earlier stage than a general external thread. By this setting, the bolt 1 can make it easier to correct deviation of the axis from the internal thread, as compared with a general external thread.

The guide portion 12 has a shape in which the guide portion 12 expands toward the base end side to become wider in transition from the starting end portion 12a to the terminal end portion 12b. With this shape, the angle θ2 is set in the range described above, and the terminal end portion 12b is formed so as to overlap with the starting end portion of the threaded portion 13, whereby the starting end portion 12a of the guide portion 12 is located toward the base end to be separated away from the extension of a helix 13C passing through the crest of the ridge 13A (see FIG. 3).

Figure 5:
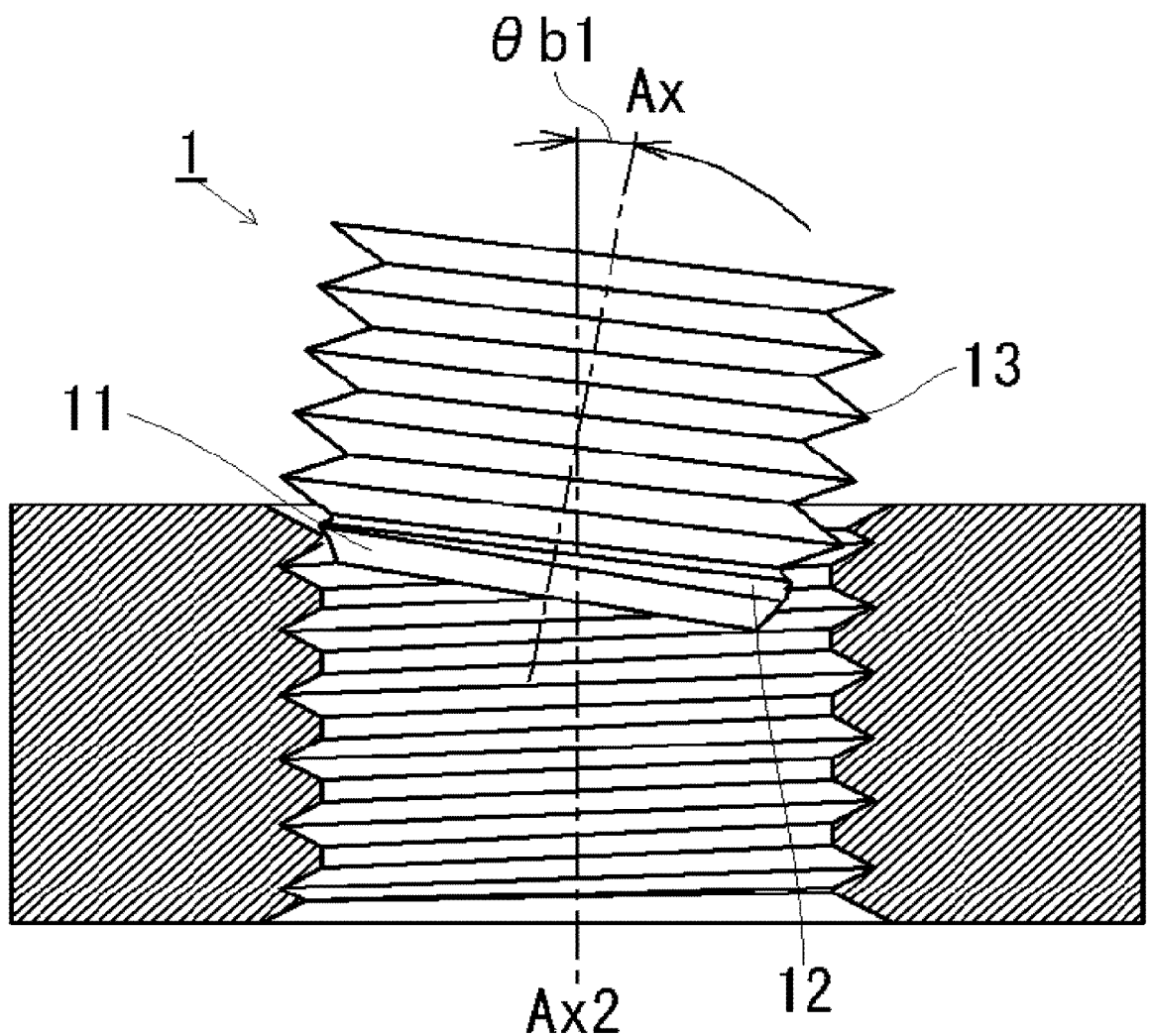
FIG. 5 is a view showing a state in which a tilt angle of the bolt of the present embodiment with respect to an axis of an internal thread is larger than an attitude correction limit.

FIG. 5 shows a case where the tilt angle of the axis Ax of the bolt 1 with respect to an axis Ax2 of the internal thread is an angle θb1 larger than an attitude correction limit value. In this case, the guide portion 12 having a diameter smaller than that of the threaded portion 13 does not come into contact with the internal thread, and even if an attempt is made to tighten the bolt 1, since the starting end portion 12a of the guide portion 12 is positionally deviated from the extension of the helix passing through the crest of the ridge 13A toward the base end, the guide portion 12 does not forcibly catch the internal thread. Since the starting end portion of the threaded portion 13 is formed so as to overlap with the terminal end portion 12b of the guide portion 12, unless the guide portion 12 forcibly catches the internal thread, the probability that the threaded portion 13 meshes with the internal thread is very small. Accordingly, when the threaded portion 13 does not mesh with the internal thread, the bolt 1 tends to idle, and the incidence of seizure is reduced.

Figure 6:
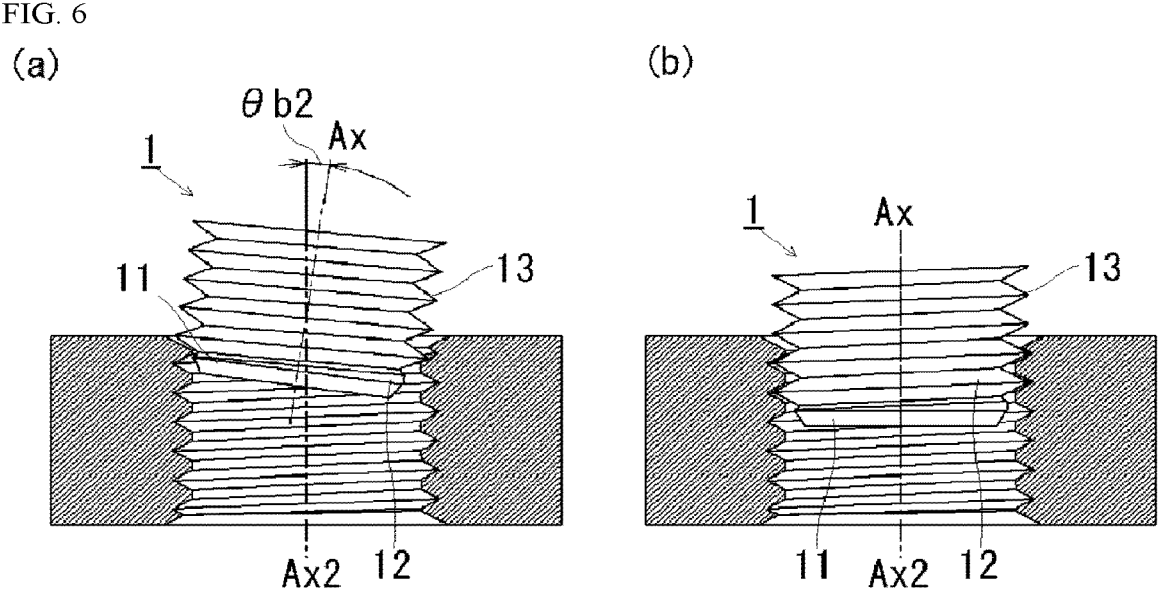
FIG. 6(a) is a view showing a state in which the bolt tilts in a state in which the tilt angle of the bolt of the present embodiment with respect to the axis of the internal thread is smaller than the attitude correction limit.
FIG. 6(b) is a view showing a state in which the tilt is corrected in the state in which the tilt angle of the bolt of the present embodiment with respect to the axis of the internal thread is smaller than the attitude correction limit.

FIG. 6(a) shows a case where the tilt angle of the axis Ax of the bolt 1 with respect to the axis Ax2 of the internal thread is an angle θb2 smaller than the attitude correction limit value. In this case, the guide portion 12 comes into contact with the internal thread to enter a state where the internal thread can be caught. When an attempt is made to tighten the bolt 1 in this state, the internal thread is guided from the terminal end portion 12b of the guide portion 12 to the starting end portion of the threaded portion 13, and as shown in FIG. 6(b), the attitude of the bolt 1 is corrected so that the pitch of the threaded portion 13 is matched with the pitch of the internal thread, so that normal fastening can be achieved.

The attitude correction limit value is set to be preferably less than 10°, more preferably 8° or less, still more preferably 6° or less. When the attitude correction limit value is 10° or more, the incidence of seizure increases.

Figure 7:
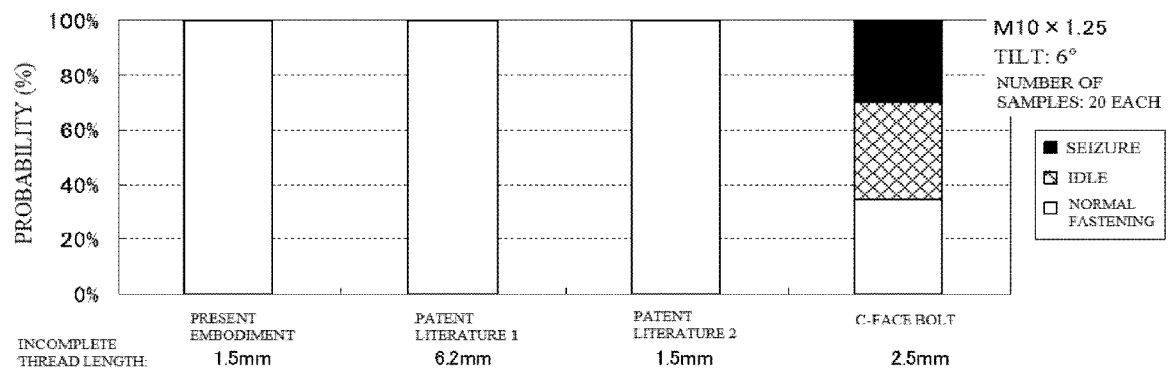
FIG. 7 is a view showing a result of an oblique insertion performance confirmation test (tilt angle: 6°) in the bolt of the present embodiment, bolts of Patent Literatures 1 and 2, and a general C-face bolt.
Figure 8:
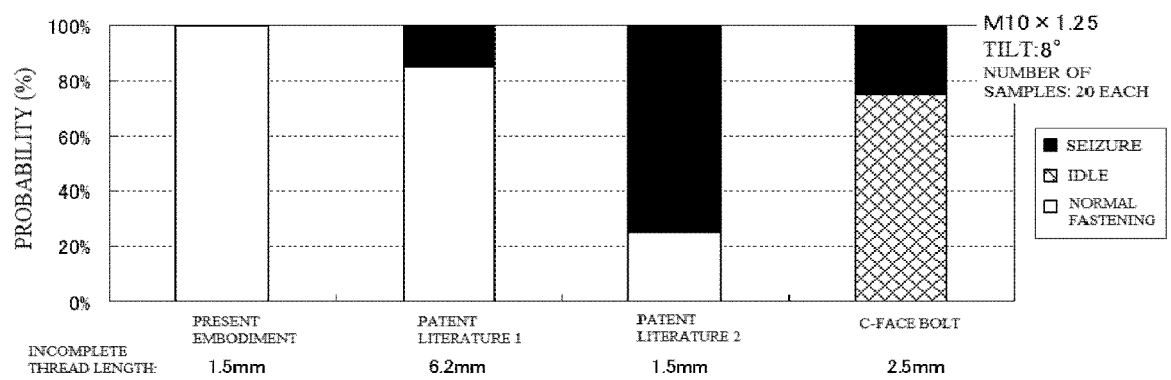
FIG. 8 is a view showing a result of the test in which the tilt angle of the bolt is changed to 8° in the test condition of FIG. 7.
Figure 9:
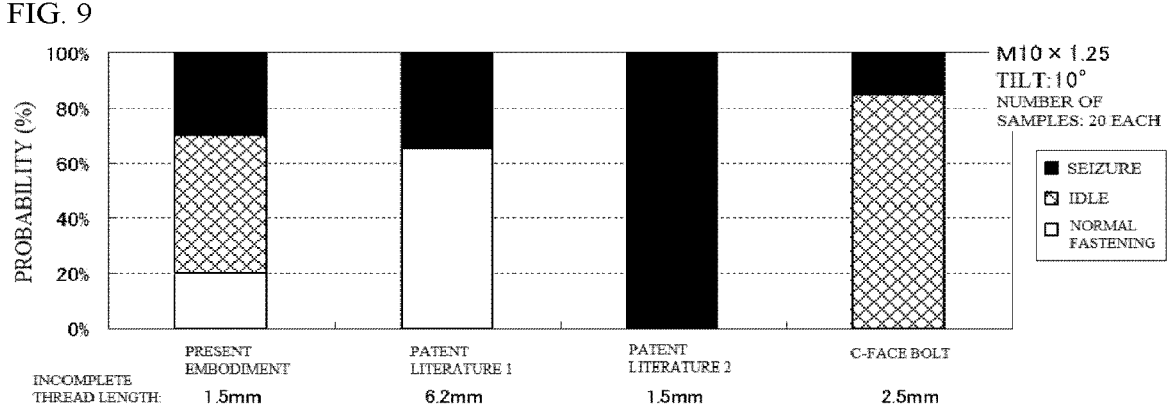
FIG. 9 is a view showing a result of the test in which the tilt angle of the bolt is changed to 10° in the test condition of FIG. 7.

FIGS. 7, 8, and 9 are graphs showing results of an oblique insertion performance confirmation test in the bolt of the present embodiment, bolts of Patent Literatures 1 and 2, and a general C-face bolt.

Figure 10:
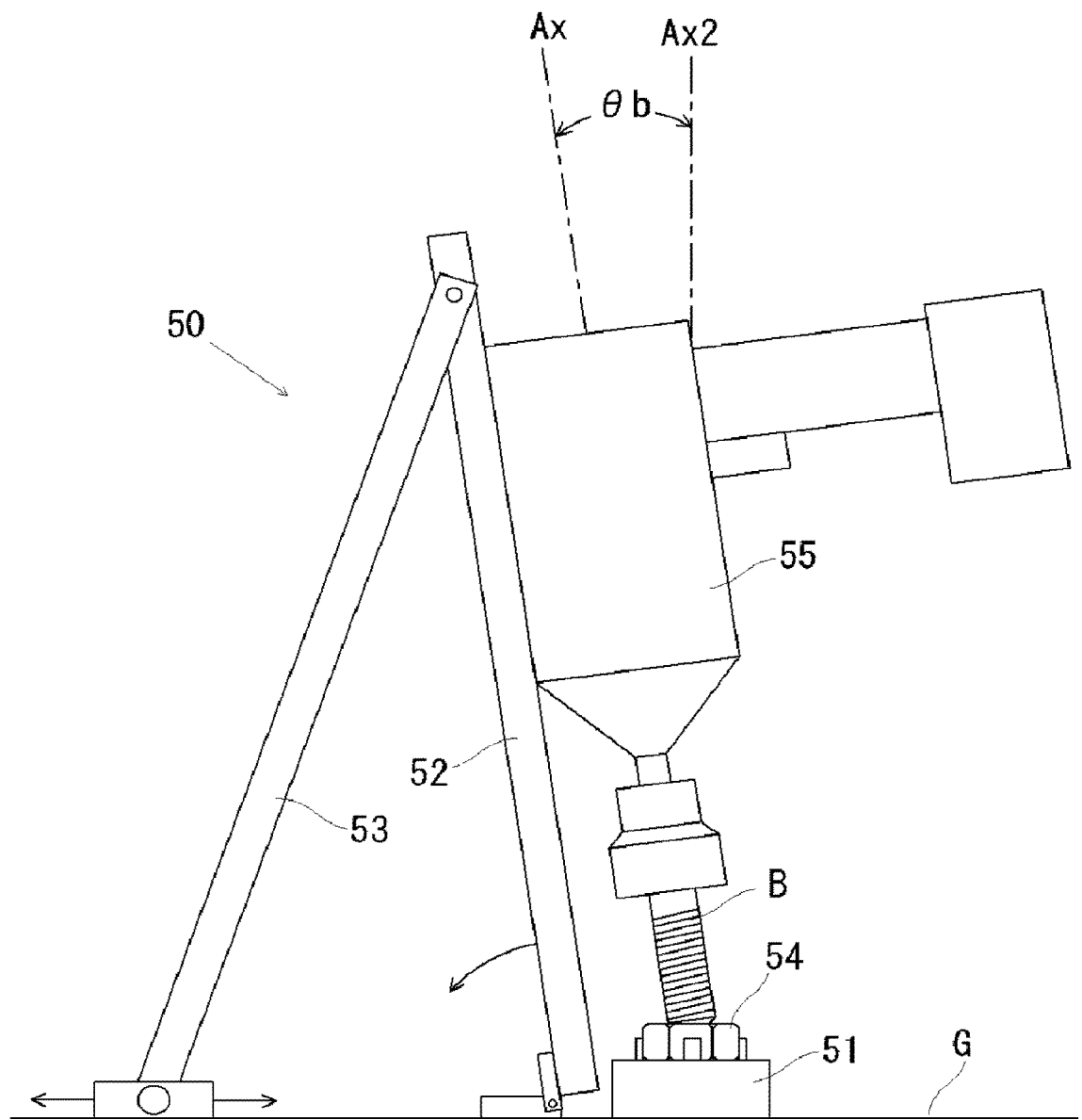
FIG. 10 is a view showing a test apparatus used in the oblique insertion performance confirmation test.

The oblique insertion performance confirmation test was performed under the test conditions shown below using a test apparatus 50 shown in FIG. 10.

Here, the test apparatus 50 has a fixing jig 51, an abutment plate 52, and a support 53 that are installed on a test stand G. A nut 54 is fixed onto the fixing jig 51. The abutment plate 52 is disposed near the fixing jig 51 and can tilt with respect to the axis Ax2 of the internal thread of the nut 54 as shown by an arrow in the drawing. An upper end portion of the support 53 is rotatably connected to an upper end portion of the abutment plate 52, and a lower end portion of the support 53 is slidably movable on the test stand G as shown by arrows in the drawing, whereby the abutment plate 52 which is tilted with respect to the axis Ax2 so that a measurement angle is θb is supported and fixed.

[Test Conditions]
(Test Method)

In the test apparatus 50, the abutment plate 52 is tilted at the measurement angle θb and supported and fixed by the support 53. Next, a bolt B to be tested is attached to an impact wrench 55, and a back portion of the impact wrench 55 is caused to abut on the abutment plate 52. In this state, tightening of the bolt B against the nut 54 was performed, and pass/fail determination during tightening was performed.

(Pass/Fail Determination)

Seizure: the ridge of the bolt B or the nut 54 is deformed, and the bolt B cannot be inserted.

Idle: the ridge of the bolt B does not mesh with the internal thread of the nut 54, and the bolt B idles.

Normal fastening: the bolt B is smoothly inserted into the nut 54.

(Number of Measurement Samples)

20 samples for each of the present embodiment, Patent Literature 1, Patent Literature 2, and the C-face bolt.

(Probability)

Among the 20 samples to be measured, the number of seizures, the number of times of idling, and the number of times of normal fastening were measured, and the percentage was calculated.

(Sizes of Bolts and Nuts Tested)

M10 (nominal diameter: 10 mm)×1.25 (pitch (mm))

(Test Bolt)

An incomplete thread length from the distal end of the threaded portion to the distal end of the shank was 1.5 mm in the present embodiment, 6.2 mm in Patent Literature 1, 1.5 mm in Patent Literature 2, and 2.5 mm in the C-face bolt.

(Impact Wrench Used)

Weight: 1.65 kg

Rotational speed: 2300 rpm (Measurement Angle)

$\theta b=6°$ in FIG. 7, $\theta b=8°$ in FIG. 8, and $\theta b=10°$ in FIG. 9.

As a result of the above-mentioned oblique insertion performance confirmation test, the probability that the bolt of the present embodiment was fastened normally or idled was extremely high, and the seizure occurred only about 30% only when the tilt angle was 10°, so that the incidence of seizure was extremely low.

On the other hand, in the bolts of Patent Literatures 1 and 2, the seizure occurred even when the tilt angle was 8°, and in the general C-face bolt, the seizure already occurred once the tilt angle was 6°.

Taking overall consideration on the incidence of seizure and the incomplete thread length on the distal end side, it was shown that the bolt of the present embodiment was most suitable for the market demand (improvement in workability, weight reduction) among the above four types of test bolts.

REFERENCE SIGNS LIST

1 bolt
11 tapered portion
12 guide portion
13 threaded portion
14 groove portion

The invention claimed is:

1. A bolt comprising a tapered surface, a guide portion, and a threaded portion in order from a distal end side,
   wherein the guide portion exists on extension of a same helix as a groove of the threaded portion and is formed between a groove portion formed at a distal end portion of the threaded portion so that a depth in a radial direction of the groove portion is deeper than the groove and a surface end position on a base end side of the tapered surface;
   wherein the guide portion has a shape extending in a direction around an axis of the bolt from a starting end portion to a terminal end portion and expanding in an axial direction of the bolt in transition from the starting end portion to the terminal end portion, the starting end portion being an intersection between the surface end position on the base end side of the tapered surface and a helix according to the groove portion;
   wherein the guide portion and the threaded portion are continuously formed such that the distal end portion of the threaded portion overlaps with the terminal end portion of the guide portion; and
   wherein the guide portion is a part corresponding to a range from 90° to 360° as an angle in the direction around the axis of the bolt from the starting end portion.

2. The bolt according to claim 1, wherein a diameter of the guide portion is set to be smaller than a minor diameter of an internal thread corresponding to the bolt and larger than a diameter of the groove of the bolt.

3. The bolt according to claim 1, wherein a ridge has a complete height when the angle in the direction around the axis of the bolt is in the range of 30° to 180° in a terminal end portion of the guide portion.

4. The bolt according to claim 1, wherein a radial dimension of the bolt in the guide portion with reference to a bottom of the groove portion is 0.4 to 0.6 times the height of the ridge in the threaded portion with reference to a bottom of the groove of the bolt.

5. The bolt according to claim 1, wherein an angle with respect to an axis of the bolt is in the range of 15° to 45° and a diameter at a distal end of the bolt is 0.7 to 0.9 times a nominal diameter of the bolt, in the tapered surface.

\* \* \* \* \*